United States Patent [19]
McElhaney et al.

[11] Patent Number: 5,317,158
[45] Date of Patent: May 31, 1994

[54] UNITARY SCINTILLATION DETECTOR AND SYSTEM

[75] Inventors: Stephanie A. McElhaney, Oak Ridge; Marion M. Chiles, Knoxville, both of Tenn.

[73] Assignee: Martin Marietta Energy Systems, Inc., Oak Ridge, Tenn.

[21] Appl. No.: 781,550

[22] Filed: Oct. 22, 1991

[51] Int. Cl.[5] .............................................. G01T 1/20
[52] U.S. Cl. ................................... 250/367; 250/369; 250/486.1
[58] Field of Search ....................... 250/367, 369, 486.1

[56] References Cited

U.S. PATENT DOCUMENTS

| | | | |
|---|---|---|---|
| 2,910,592 | 10/1959 | Armistead | 250/367 |
| 3,032,659 | 5/1962 | Bacon et al. | |
| 3,988,586 | 10/1976 | Stuart et al. | 250/369 |
| 5,006,713 | 4/1991 | Miller | 250/361 R |
| 5,149,971 | 9/1992 | McElhaney et al. | 250/361 R |

FOREIGN PATENT DOCUMENTS

| | | | |
|---|---|---|---|
| 188869 | 9/1985 | Japan | 250/367 |
| 74890 | 3/1990 | Japan | 250/367 |

OTHER PUBLICATIONS

M. M. Chiles, M. L. Bauer and S. A. McElhaney; "Multi-Energy Neutron Detector for Counting Thermal Neutrons, and Gamma Photons Separately"; Presented Oct. 25, 1989, IEEE/Nucl. Sci Sym., San Francisco.

S. A. McElhaney, J. A. Ramsey, M. L. Bauer, and M. M. Chiles; "A Ruggidized ZnS(Ag)Epoxy Alpha Scintillation Detector"; Presented May 21-24, 1990, 7th Sym. on Rad. Meas. & Appl., U. of Michigan, Ann Arbor.

Primary Examiner—Carolyn E. Fields
Attorney, Agent, or Firm—James M. Spicer; Harold W. Adams

[57] ABSTRACT

The invention is a unitary alpha, beta, and gamma scintillation detector and system for sensing the presence of alpha, beta, and gamma radiations selectively or simultaneously. The scintillators are mounted in a light-tight housing provided with an entrance window for admitting alpha, beta, and gamma radiation and excluding ambient light from the housing. Light pulses from each scintillator have different decay constants that are converted by a photosensitive device into corresponding differently shaped electrical pulses. A pulse discrimination system identifies the electrical pulses by their respective pulse shapes which are determined by decay time. The identified electrical pulses are counted in separate channel analyzers to indicate the respective levels of sensed alpha, beta, and gamma radiations.

20 Claims, 10 Drawing Sheets

UNITARY SCINTILLATION DETECTOR AND SYSTEM

This invention was made with Government support under contract DE-AC05-84OR21400 awarded by the U.S. Department of Energy to Martin Marietta Energy Systems, Inc. and the Government has certain rights in this invention.

FIELD OF THE INVENTION

The invention relates to a unitary multiple radiation detector and system and more particularly to a unitary alpha, beta, gamma scintillation detector and system.

BACKGROUND OF INVENTION

A scintillator is a material (either phosphor or crystalline structure) which emits scintillations (light) when excited by radioactivity such as alpha, beta, and gamma radiation. The scintillator light is directed to a photosensitive device to produce electrical output signal pulses directly related to the different radiations.

It is known to use individual alpha, beta, and gamma scintillators to conduct separate surveys of an area, object, or person for the presence of alpha, beta, and gamma radiation. It is also known to use combined scintillators for sensing alpha/beta and beta/gamma radiation.

Typically, such scintillators are mounted in a light-tight housing and may be provided with an entrance window formed of an aluminized plastic material to prevent ambient light from entering the radiation admitting entrance window.

An object of the invention is to provide a unitary scintillation detector and system for sensing the presence of alpha, beta, and gamma radiations selectively or simultaneously.

Another object of the invention is to provide a unitary assembly of individual and coupled alpha, beta, and gamma sensitive scintillators having different decay constants.

Still another object is to provide unitary assembly of alpha, beta, and gamma scintillators in which the alpha and beta scintillators are combined in a monolithic structure.

Yet another object of the invention is to provide a scintillation detector and system in which the decay constants of alpha, beta, and gamma scintillators are selectively or simultaneously used to sense the presence of alpha, beta, and gamma radiations.

SUMMARY OF THE INVENTION

In accordance with the invention, a unitary scintillation detector and system for sensing the presence of alpha, beta, and gamma radiations may include an assembly of alpha, beta, and gamma sensitive scintillators mounted in a light-tight housing provided with an entrance window for passing alpha, beta, and gamma radiations into the housing without substantial attenuation. The respective scintillators emit light pulses having different decay constants when subjected to alpha, beta, and gamma radiations respectively. Pulse discrimination circuit means are provided for selectively or simultaneously sensing the light pulses of the respective scintillators based on the different decay constants and indicating the presence of alpha, beta, and gamma radiations.

BRIEF DESCRIPTION OF THE DRAWINGS

The above and numerous other objects and advantages of the invention will become apparent from a reading of the following detailed description when read in view of the appended drawings wherein.

DETAILED DESCRIPTION OF THE INVENTION

Figure 1:
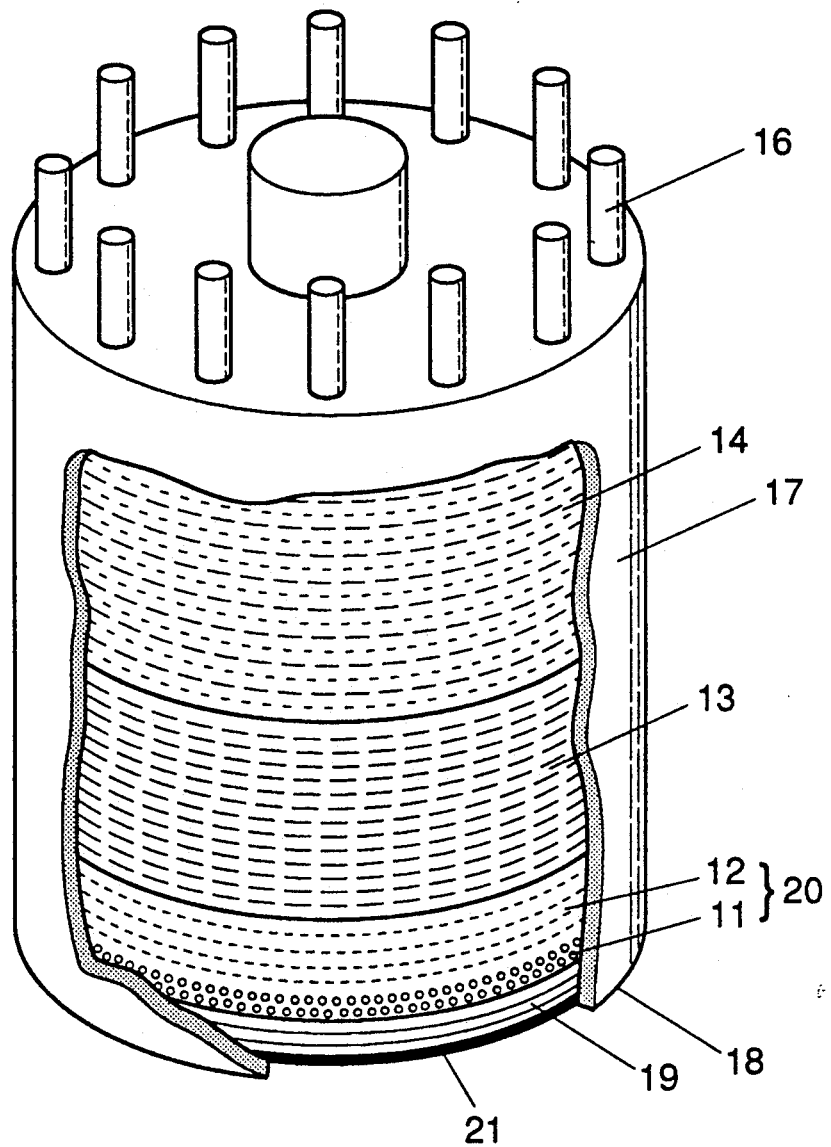
FIG. 1 is a perspective shown in a partial cross-section of a preferred embodiment of a unitary alpha, beta, and gamma scintillation detector in accordance with the invention.

Referring to the drawings, FIG. 1 illustrates a preferred embodiment of the invention as generally comprising an assembly of an alpha scintillator 11 settled into a beta scintillator 12 to form a monolithic alpha/beta scintillator (20). This unit (20) is then coupled to a gamma scintillator 13. The scintillators are coupled, as is well known, to a conventional photosensitive device such as a photomultiplier tube 14 provided with output signal pins 16. This entire assembly is mounted in a suitable environment proof, light-tight cylindrical housing 17.

A light-tight entrance window 19 located at the end 18 of housing 17 admits alpha, beta, and gamma radiations into the housing 17 with substantially no attenuation. The entrance window 19 may be formed of a thin layer of aluminum evaporated directly onto the alpha-settled surface of the alpha/beta scintillator 20. The window 19 is protected from the environment by applying a thin layer 21 of a hard-coat material such as cyanoacrylate. The alpha scintillator 11 is combined with the beta scintillator 12 in a monolithic structure formed by settling a very thin layer of an alpha-sensitive phosphor such as silver-activated zinc sulfide ZnS,(Ag) into a lightpipe fabricated from a curable liquid beta scintillator material such as Bicron BC-490 which forms the beta scintillator 12. The alpha scintillator 11 is added to the liquid beta scintillator 12 and mixed until the phosphor is homogeneously dispersed throughout the medium. Extra ingredients, such as butyl acetate or like chemical, may be added to the mixture to lower the initial viscosity. The added chemical should only serve to lower the viscosity and not change the chemical properties of either the alpha 11 or beta 12 scintillator. The liquid mixture is poured into a mold of desired shape and size to cure according to manufacturer's specifications. The gamma scintillator 13 is coupled to the face opposed to the alpha-settled face and may be sodium-activated cesium iodide [CsI(Na)].

The settling technique used in forming the monolithic alpha-beta scintillator unit 20 provides a microscopically smooth end surface that is easily overcoated with an electron-beam evaporated, thin layer of aluminum to form the entrance window 19. The resulting light-tight and pinhole-free aluminum entrance window 19 is protected from physical and chemical damage by applying a thin layer 21 of cyanoacrylate or other hard-coat material. The overcoating layer 21 is thin enough not to attenuate alpha particles but still remain resistant to physical and chemical damage.

An important criterium for developing such an alpha, beta, and gamma detector assembly involves choosing three scintillators 11, 12, and 13 with different decay time constants. Light pulses from each of the scintillators 11, 12, and 13 possess characteristic waveshapes $\tau_1$, $\tau_2$, and $\tau_3$ that are converted into correspondingly shaped electrical pulses by photomultiplier tube 14 as shown in FIG. 3.

Figure 3:
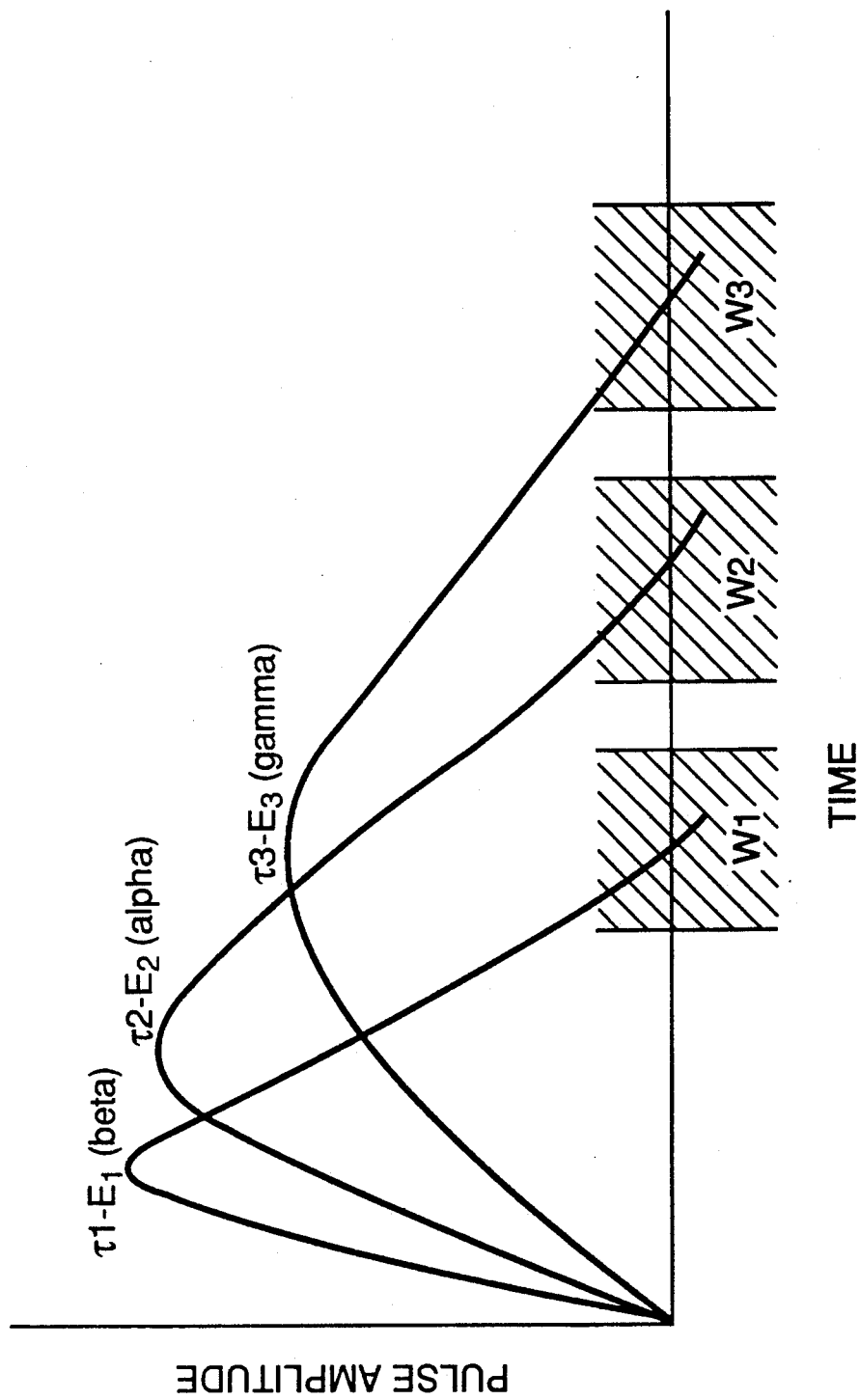
FIG. 3 is a pulse diagram illustrating the different decay constants of the output light pulses $\tau_1$, $\tau_2$, and $\tau_3$ and corresponding electrical pulses $E_1$, $E_2$, and $E_3$ from the respective scintillators.
Figure 4:
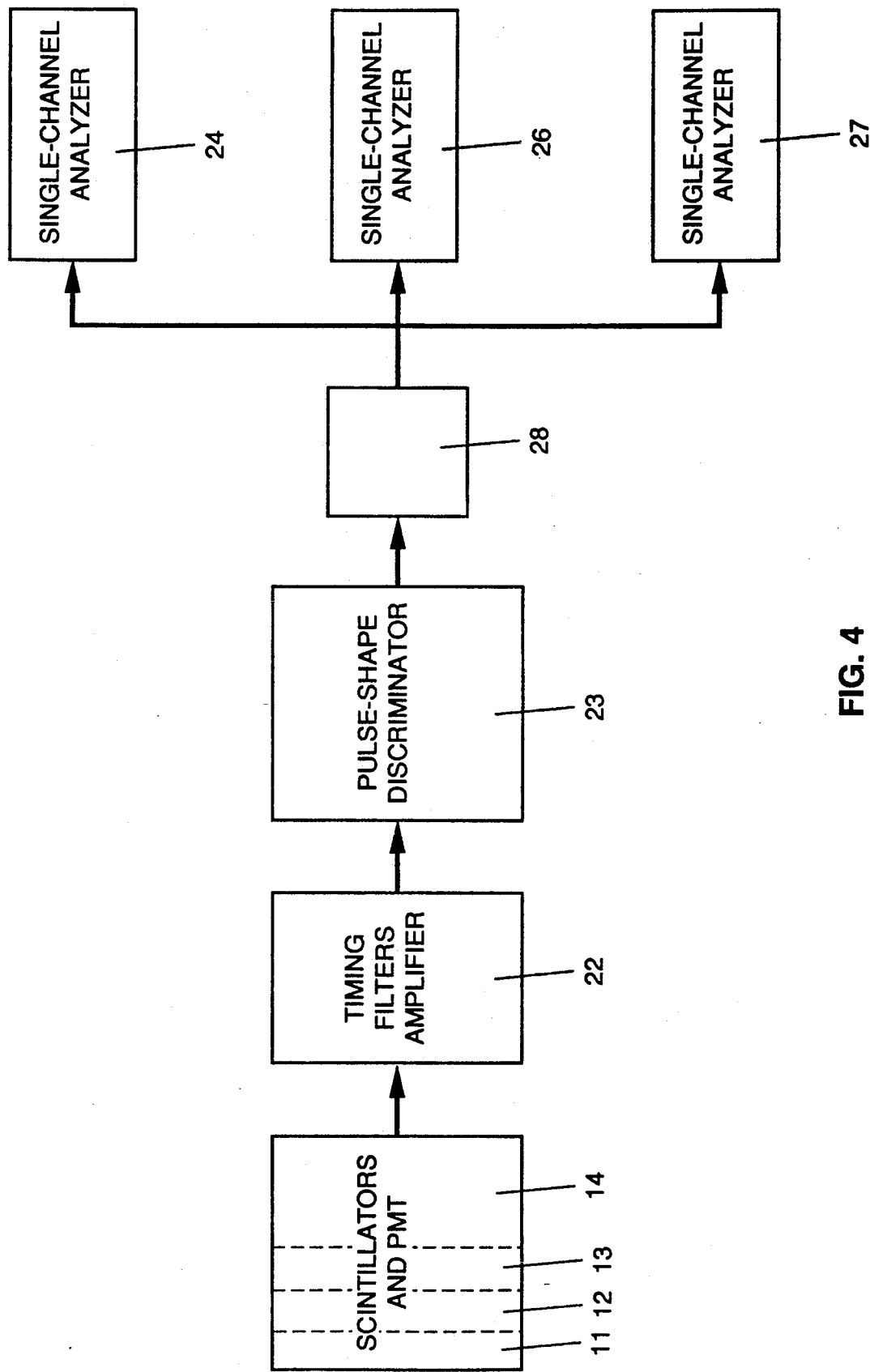
FIG. 4 is an electrical block diagram of a pulse discrimination system for sensing, selectively or simultaneously, the electrical pulses $E_1$, $E_2$, and $E_3$ based on the decay constants or times $W_1$, $W_2$, and $W_3$ of the corresponding and respective output light pulses $\tau_1$, $\tau_2$, and $\tau_3$ and indicating the presence of any sensed alpha, beta, and gamma radiations.

In the pulse discrimination system of FIG. 4, the electrical pulses $E_1$, $E_2$, and $E_3$ are processed by a conventional timing filter-amplifier 22 to establish distinctive baseline or zero crossing points or times $W_1$, $W_2$, and $W_3$, shown in FIG. 3. A pulse-shape discriminator 23 electronically windows the crossing points $W_1$, $W_2$ and $W_3$. Thus the electrical pulses $E_1$, $E_2$, and $E_3$ are identified as resulting from the presence and detection of alpha, beta, or gamma radiations.

The electrical pulses $E_1$, $E_2$, and $E_3$ are directed into single channel analyzers 24, 26, and 27 for counting either selectively or simultaneously by a selector switch 28. Since timing filter-amplifier 22, pulse-shape discriminator 23, and channel analyzers 24, 26, and 27 are commercially available and their operation is well known, no further technical description of an pulse-shape discriminator circuit system is deemed required. By electronically windowing these zero-crossing points, $W_1$, $W_2$, and $W_3$, pulses $E_1$, $E_2$, and $E_3$ are identified as being from either alpha, beta, and gamma radiations and are directed into the separate single-channel analyzers 24, 26, and 27 for counting by selector switch 28.

As the invention provides a unitary alpha, beta, and gamma scintillation detector that is both chemically resistant and physically rugged, several "problem" areas of environmental and health physics monitoring can be alleviated using the invention.

An important feature of the alpha, beta, and gamma scintillator detector illustrated in FIG. 1 is the beta scintillator 12. The beta scintillator 12 must have a low viscosity to allow for uniform settling of the alpha scintillator particles. Preferably it should also be curable to a Shore D hardness of ~80, have a low Z for minimum backscatter, and a high light output and conversion efficiency.

Other important requirements in practicing the preferred embodiment are:

(1) using three scintillators 11, 12, and 13 in the unitary alpha, beta, and gamma assembly that demonstrate good separation of decay constant pulses. One possible combination is the use of ZnS(Ag) phosphor for alpha detection (decay time constant $\tau=0.2$ $\mu s$), Nuclear Enterprise NE-120 or BC-490 plastic for beta detection ($\tau=2.4$ ns), and a CsI(Na) crystal for gamma detection ($\tau=0.65$ $\mu s$); and (2) optimizing the thickness of each scintillator 11, 12, and 13 to ensure maximum energy range detection while minimizing the possibility of erroneously detecting radiation particles in the other scintillators.

Theoretical calculations indicate that one possible unitary configuration would be a 8 mg/cm$^2$ ZnS(Ag) phosphor layer for detecting alpha particles settled in a 6-mm-thick NE-120, BC-490, or other plastic for detecting the beta particles; and a 5-in.-thick CsI(Na) crystal coupled to the monolithic alpha and beta unit 20.

Preliminary experimental tests have been conducted for several monolithic alpha-beta units by using various thicknesses of curable plastic scintillator (both NE-120 and BC-490).

Tests have shown that the monolithic alpha-beta structure of this invention is capable of detecting both alpha and beta particles.

Figure 2:
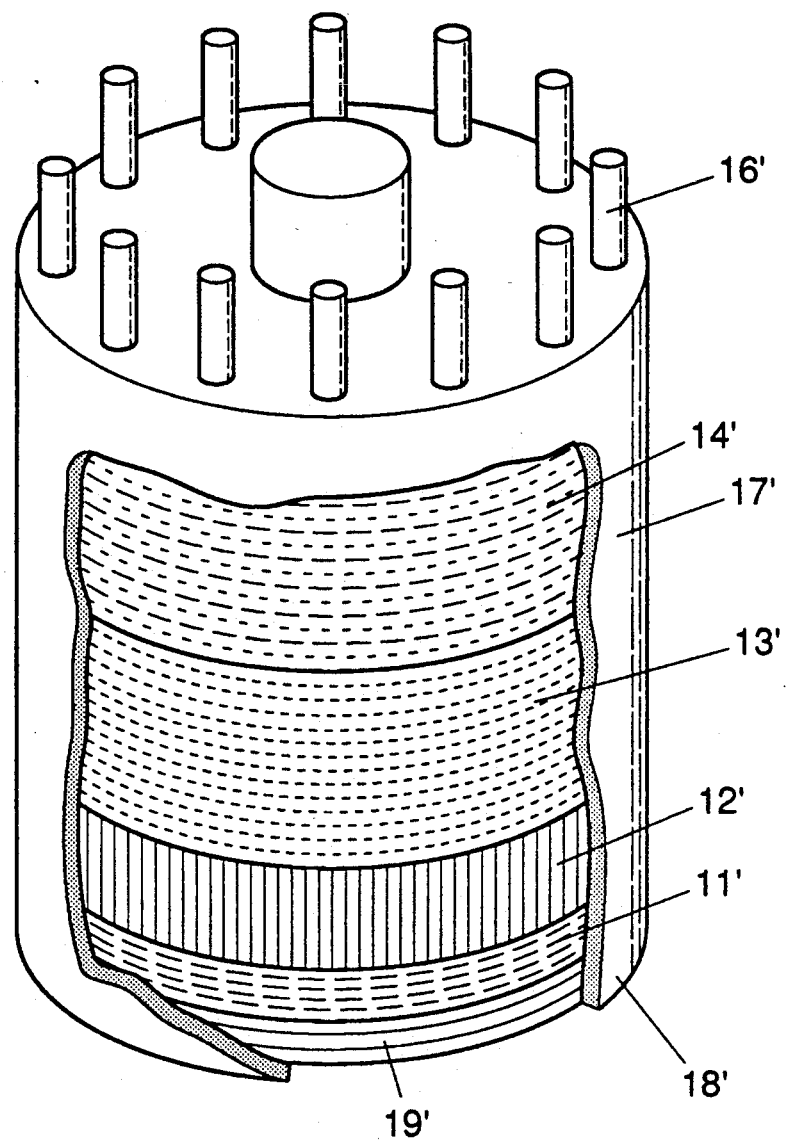
FIG. 2 is a view similar to FIG. 1 of an alternative embodiment of the invention illustrated in FIG. 1.

An alternative embodiment of FIG. 1 is shown in FIG. 2. In this configuration, the alpha and beta scintillators 11' and 12' do not form a monolithic unit. Instead, they are separate scintillators so that 11', 12', and 13' are stacked in a sandwich layer assembly as shown in FIG. 2. A layer of aluminized plastic provides a light-tight entrance window 19' to keep ambient light out of the photosensitive device (such as a photomultiplier tube 14'). The alternative embodiment shown in FIG. 2 produces similar wave forms $\tau'_1$-$E'_1$, $\tau'_2$-$E'_2$, and $\tau'_3$-$E'_3$ as shown in FIG. 7 and operates in the same manner as previously described when used in a pulse-shape discriminator system as shown in FIG. 8.

Figure 8:
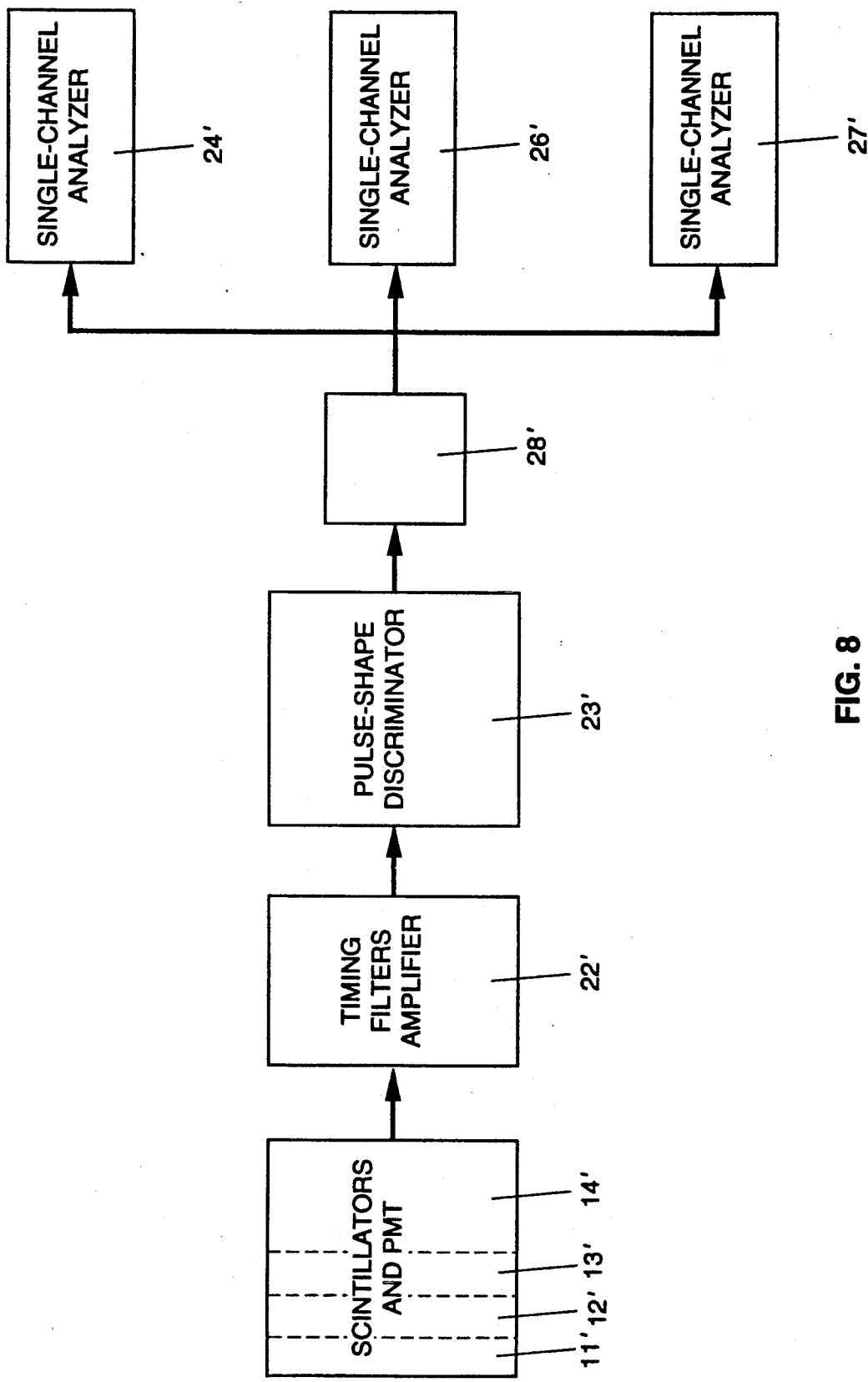
FIG. 8 is an electrical block diagram of a pulse discrimination system for sensing, selectively or simultaneously, the electrical pulses $E'_1$, $E'_2$, and $E'_3$ based on the decay constants or times $W'_1$, $W'_2$, and $W'_3$ of the corresponding and respective output light pulses $\tau'_1$, $\tau'_2$, and $\tau'_3$ and indicating the presence of any sensed alpha, beta, and gamma radiations.

Thus, as shown in FIG. 8, an alpha, beta, and gamma scintillation detector in accordance with FIG. 2 also involves selecting three distinct scintillators 11', 12', and 13' with different decay time constants. By using unique decay time for the alpha, beta, and gamma responses, the pulse discrimination system shown in FIG. 8 can be used to identify different radiations interacting in the sandwiched scintillators 11', 12', and 13'. Light pulses $\tau'_1$, $\tau'_2$, and $\tau'_3$ generated in each of the scintillators possess characteristic waveshapes that are converted to corresponding electrical output pulses $E'_1$, $E'_2$, and $E'_3$ by photomultiplier tube 14'.

Figure 7:
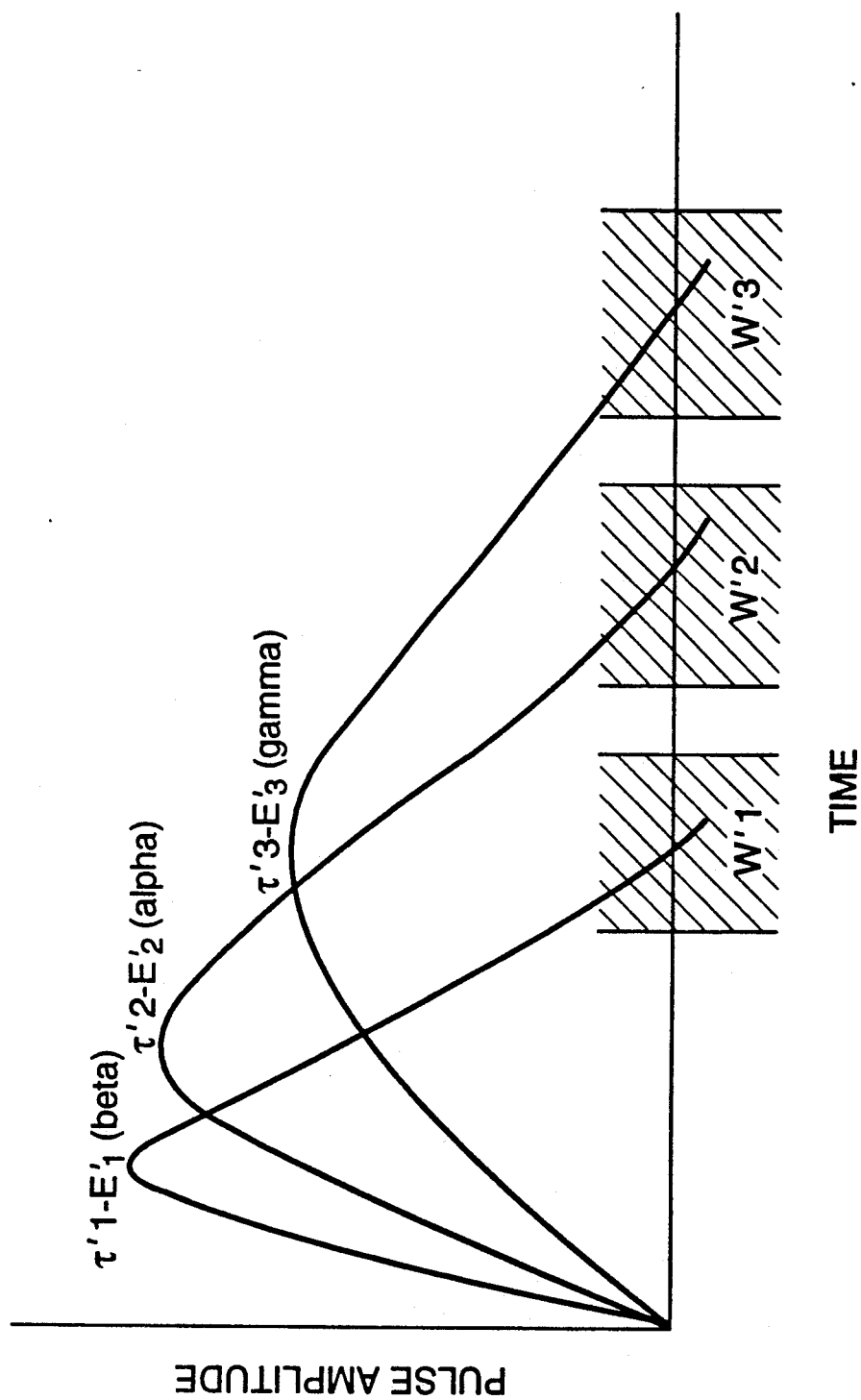
FIG. 7 is a pulse diagram illustrating the different decay constants of the output light pulses $\tau'_1$, $\tau'_2$, and $\tau'_3$ and corresponding electrical pulses $E'_1$, $E'_2$, and $E'_3$ from the respective scintillators.

Pulses $E'_1$, $E'_2$, and $E'_3$ are processed through a timing filter-amplifier 22', and a pulse shape discriminator 23' in distinctive baseline crossover times $W'_1$, $W'_2$, and $W'_3$ (FIG. 7). The resulting and corresponding electrical pulses $E'_1$, $E'_2$, and $E'_3$ are identified as being either alpha, beta, or gamma interactions. They may then be directed by a selector switch 28, into separate single-channel analyzers 24', 26', and 27' for counting selectively or simultaneously.

A unitary scintillation detector in accordance with FIG. 2 may have an alpha decay constant of 0.2 $\mu sec$ ($\tau_2'$), a beta decay of 2.5 nsec ($\tau_1'$), and a gamma decay of 0.65 $\mu sec$ ($\tau_3'$).

Figure 5:
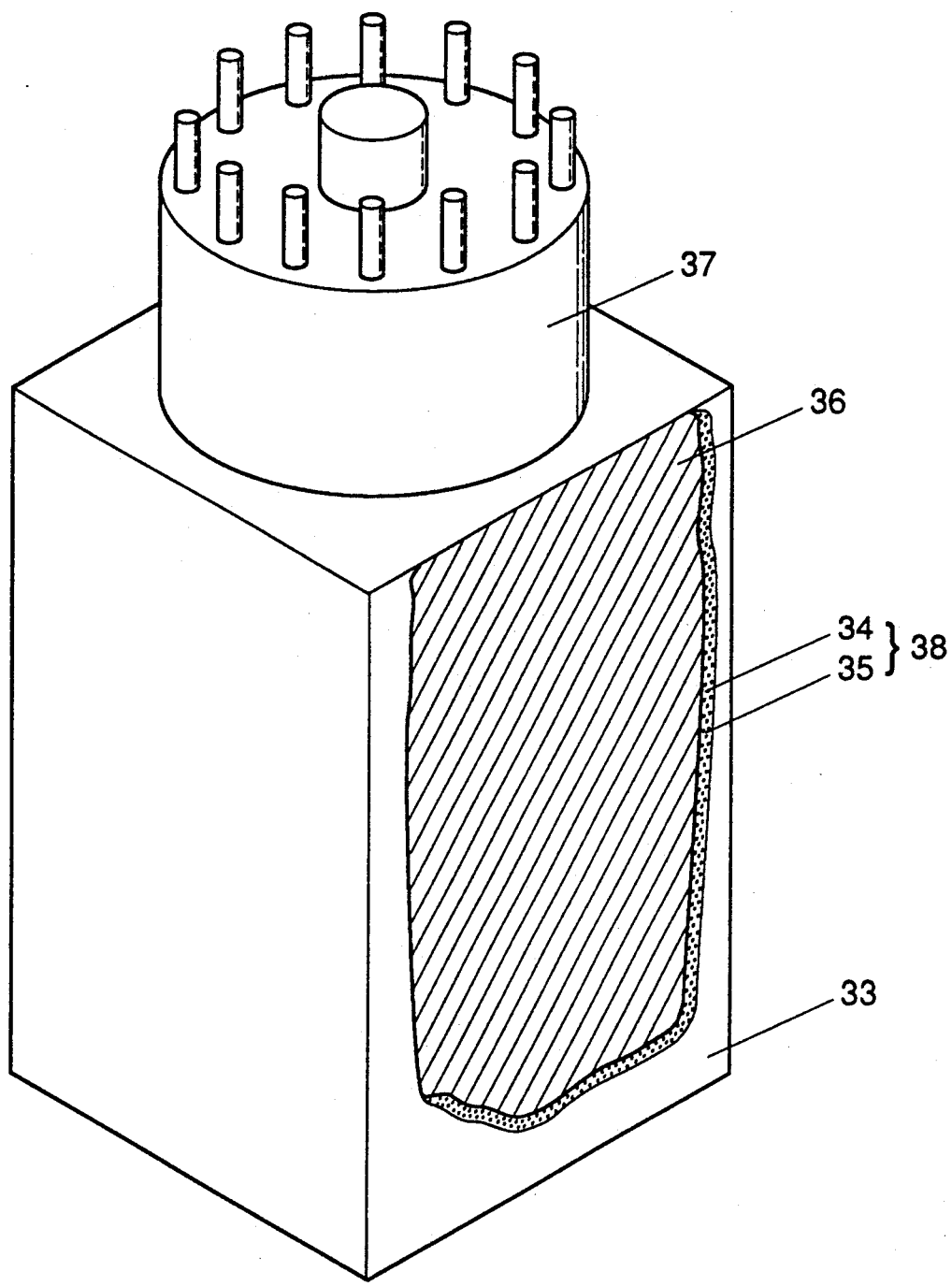
FIG. 5(a) is an alternate embodiment of FIGS. 1 and 2 demonstrating a multidirectional form of the invention.
Figure 9:
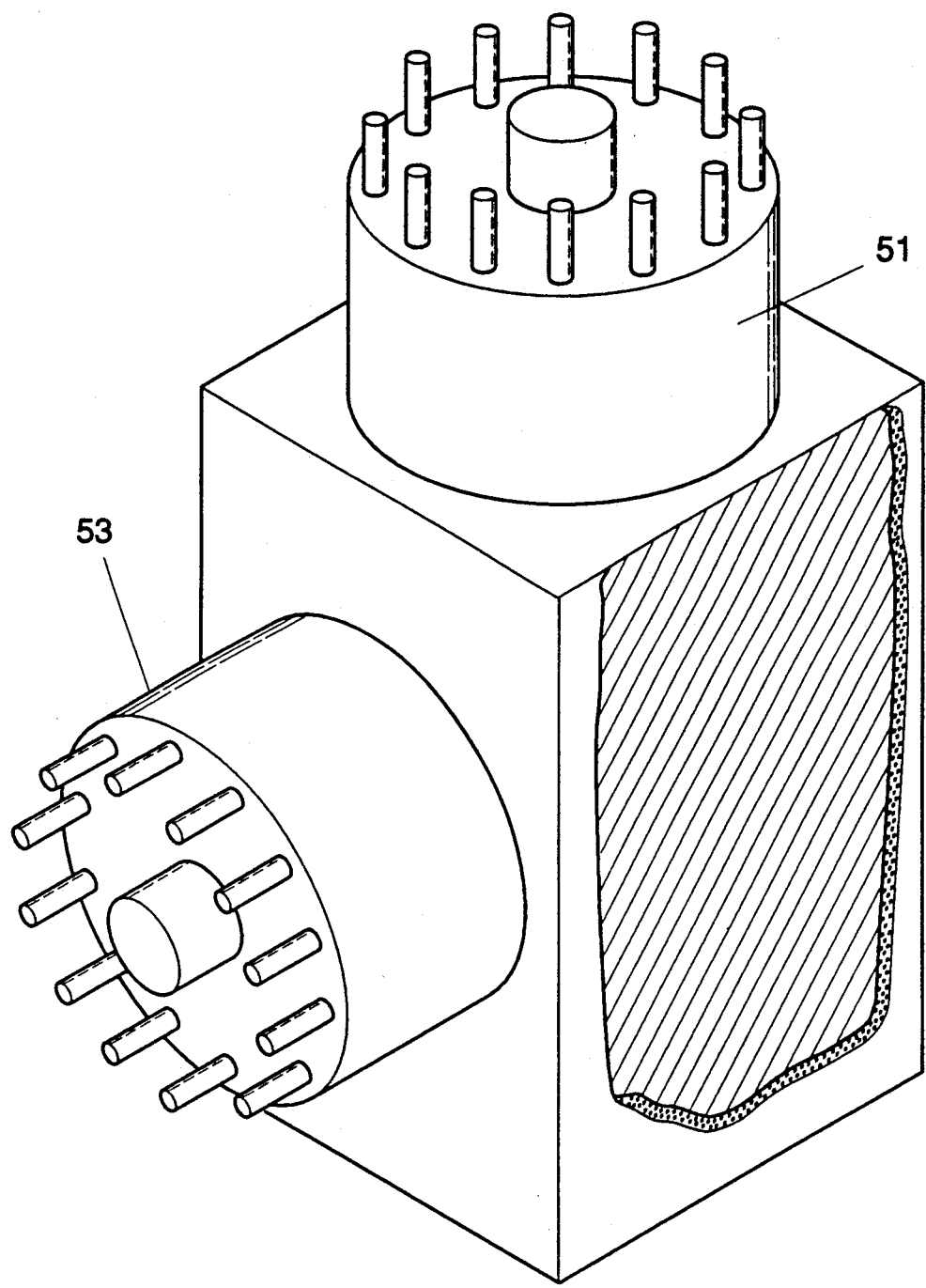
FIG. 9 is an alternate embodiment of FIG. 5 using plural photomultiplier tubes.

An alternate version of FIGS. 1 and 2 is shown in FIG. 5. In this configuration, the scintillators are no longer arranged in a sandwich configuration with the radiation entrance window and photosensitive device at opposing ends. Instead, the gamma scintillator 36 is completely surrounded by the separate alpha 34 and beta 35 scintillators or surrounded by the monolithic alpha/beta scintillator unit 38. A layer of aluminized plastic or a layer of electron-beam evaporated aluminum overcoated with hardcoat such as cyanocrylate forms the light-tight entrance window 33. A photosensitive device, such as the photomultiplier tube 37 in FIG. 5 (or the photomultiplier tubes 51,53 of FIG. 9), is attached to one (or more) side(s) of the scintillator combination to collect the light created in the scintillators.

The alpha, beta, and gamma scintillators, for both the alpha/beta monolithic unit 38 coupled to the gamma scintillator 36 and the separate alpha 34 and beta 35 scintillators coupled to the gamma scintillator 36 are designed as previously described. In the configuration shown in FIG. 5, the gamma scintillator 36 is in the shape of a special polygon, such as a square or a rectangle. A side panel of beta scintillator 35 is coupled to each of the faces of gamma scintillator 36. A side panel of alpha scintillator 34 is coupled to each of the faces of the beta scintillator 35. The entire alpha scintillator 34 surface is covered with a light-tight entrance window, leaving an opening on one side that matches, for FIG. 5, the size of the photocathode of the photomultiplier tube 37.

The side panels of separate alpha and beta scintillators may be replaced with a single, monolithic alpha/beta unit 38 where the alpha scintillator is settled in the beta scintillator, as described previously. The surface of the alpha/beta unit 38 is covered with a light-tight entrance window, leaving an opening on one or more side(s) that matches, for FIG. 5, the size of the photocathode of the photomultiplier tube 37, or, for FIG. 9, the size of the photocathodes of the photomultiplier tubes 51,53.

The alternate embodiment shown in FIG. 5 produces similar pulse forms as those shown in FIG. 3 and operates in the same manner previously described when used in a pulse-shape discriminator system as shown in FIG. 4.

Figure 6:
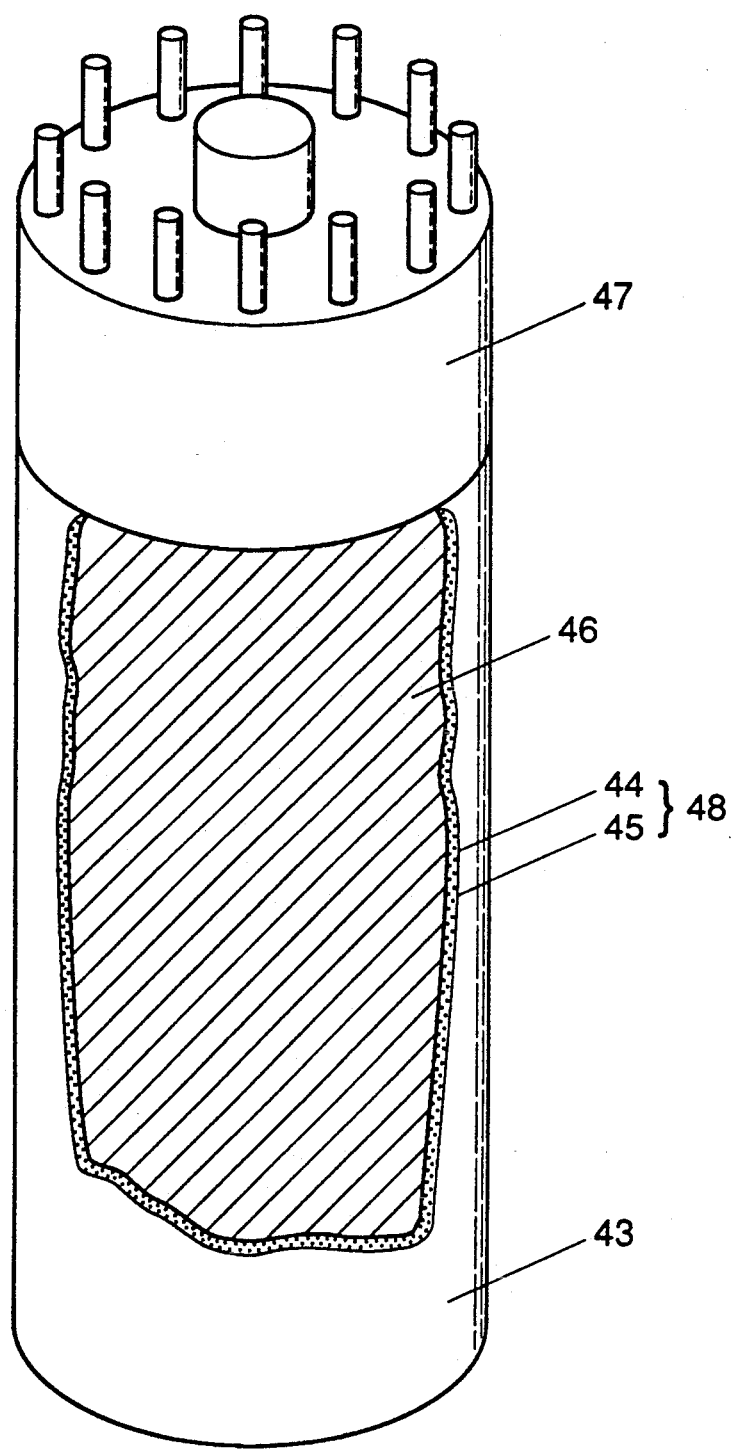
FIG. 6 is an alternate embodiment of FIG. 5 using a differently shaped set of scintillators.
Figure 10:
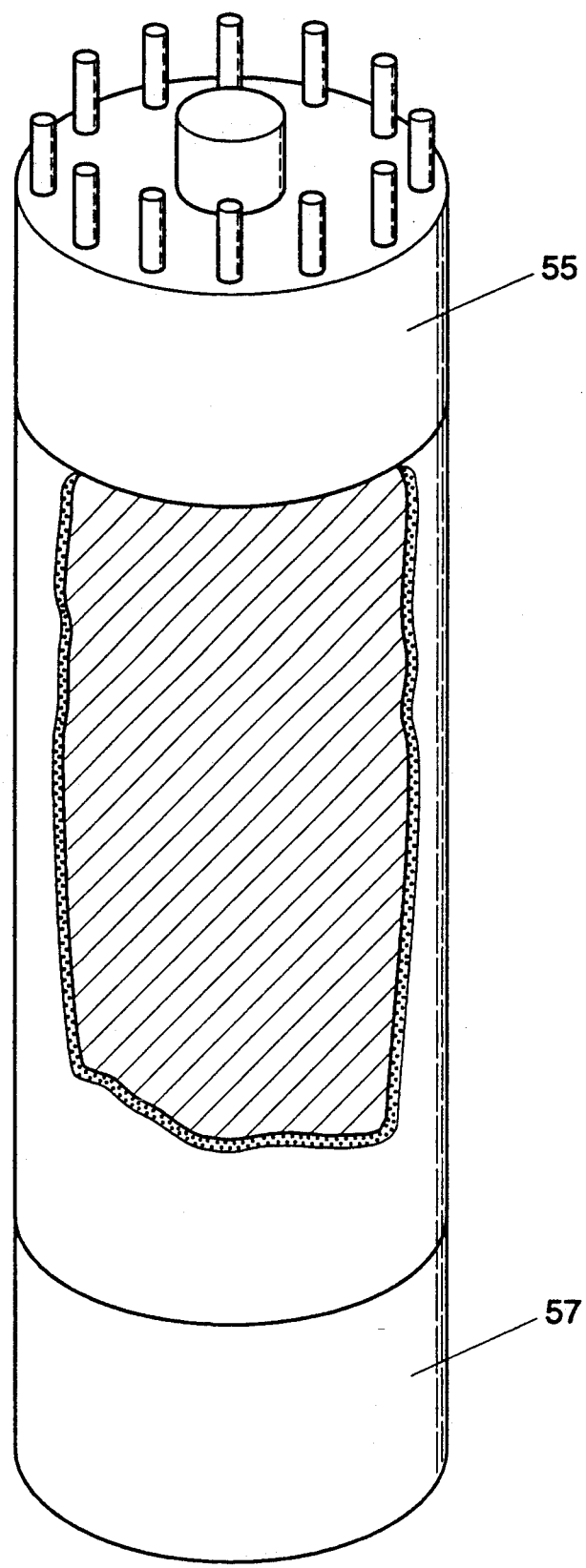
FIG. 10 is an alternate embodiment of FIG. 6 using plural photomultiplier tubes.

An alternate version of FIG. 5 is shown in FIG. 6. In this configuration, the scintillators are no longer confined to the shape of a special polygon. Instead, the gamma scintillator 46 made in a cylindrical configuration and is completely surrounded by the separate alpha 44 and beta 45 scintillators or surrounded by the monolithic alpha/beta scintillator unit 48. A layer of aluminized plastic or a layer of electron-beam evaporated aluminum overcoated with hardcoat such as cyanocrylate forms the light-tight entrance window 43. A photosensitive device, such as the photomultiplier tube 47 in FIG. 6 (or the photomultiplier tubes 55, 57 of FIG. 10), is attached to one or both ends of the cylindrical scintillator combination to collect the light created in the scintillators.

The alpha, beta, and gamma scintillators, for the separate alpha 44 and beta 45 scintillators coupled to the gamma scintillator 46 are designed as previously described. In the configuration shown in FIG. 6, the gamma scintillator 46 is in the shape of a cylinder. An encasement of a beta scintillator 45 is manufactured by machining a sleeve or cup of beta-sensitive material and coupling the beta scintillator 45 to the gamma scintillator 46. An encasement of a alpha scintillator 44 is manufactured by machining a sleeve or cup of alpha-sensitive material and coupling the alpha scintillator 44 to the beta scintillator 45. The entire alpha scintillator 44 surface is covered with a light-tight entrance window, leaving an opening on one or two end(s) that matches, for FIG. 6, the size of the photocathode of the photomultiplier tube 47, or, FIG. 10, the size of the photocathodes of the photomultiplier tubes 55, 57.

The alternate embodiment shown in FIG. 6 produces similar pulse forms as those shown in FIG. 3 and operates in the same manner previously described when used in a pulse discrimination system as shown in FIG. 4.

Thus the invention provides a rugged, multi-purpose scintillation detector capable of simultaneously determining accumulated counts from alpha, beta, and gamma radiation. The three respective radiations are identified by their pulse decay time, and the resulting electrical pulses $E_1$, $E_2$, and $E_3$ are stored and counted in three separate channels 24, 26 and 27 to determine the activity. A rugged alpha/beta scintillation unit 20 is achieved by settling an alpha-sensitive phosphor into a beta-sensitive liquid scintillator and allowing the mixture to cure into a monolithic unit. The entrance window 19 is formed by adding a thin aluminum layer directly on the alpha/beta scintillator unit 20. A thin hard overcoat 21 is applied to the aluminum entrance window 19.

The invention provides a unitary scintillation detector capable of measuring the total amount of radiation contributed from alphas, betas, and gammas and has many different applications in the fields of health physics, radiation surveys of equipment, spills, personnel, laundry, waste facilities and monitoring of waste water and gaseous streams.

While preferred embodiments have been described in detail. Numerous changes can be made within the principles of the invention which is to be limited only by the appended claims.

What is claimed is:

1. A unitary scintillation detector for sensing the presence of alpha, beta, and gamma radiations comprising:

a housing having opposed ends, one of which is open and the second of which is closed by a light-tight aluminum entrance window, said entrance window capable of passing alpha, beta and gamma radiations into said housing without substantial attenuation;

three scintillators in series within said housing, said scintillators comprising a monolithic alpha/beta scintillator and a gamma scintillator, said monolithic alpha/beta scintillator comprising an alpha scintillator settled in a beta scintillator, said aluminum entrance window formed on the alpha scintillator end of said monolithic alpha/beta scintillator, said gamma scintillator located adjacent said open end of said housing, said alpha, beta and gamma scintillators successively responsive to said alpha, beta and gamma radiations passing through said entrance window, and each of said scintillators emitting light pulses having different decay constants for said alpha, beta and gamma radiations; and single photosensitive means located at said open end of said housing, said photosensitive means responsive to said light pulses emitted from said scintillators and producing electrical signals therefrom.

2. The invention as defined in claim 1 wherein said entrance window is covered by a non-alpha-attenuating layer of a hard coat material.

3. The invention as defined in claim 2 wherein said hard-coat layer is formed of cyanoacrylate.

4. The invention as defined in claim 1 wherein said beta scintillator is formed of a low viscosity material to allow for uniform settling of alpha scintillator particles therein prior to hardening.

5. The invention as defined in claim 1 wherein said single photosensitive means is a photomultiplier tube.

6. A unitary scintillation detector for sensing the presence of alpha, beta, and gamma radiations comprising:
   a housing having opposed ends, one of which is open and the second of which is closed by a light-tight aluminum entrance window, said entrance window capable of passing alpha, beta and gamma radiations into said housing without substantial attenuation;
   three scintillators in series within said housing, said scintillators comprising a monolithic alpha/beta scintillator and a gamma scintillator, said monolithic alpha/beta scintillator comprising an alpha scintillator settled in a beta scintillator, said aluminum entrance window formed on the alpha scintillator end of said monolithic alpha/beta scintillator, said gamma scintillator located adjacent said open end of said housing, said alpha, beta and gamma scintillators successively responsive to said alpha, beta and gamma radiations passing through said entrance window, and each of said scintillators emitting light pulses having different decay constants for said alpha, beta and gamma radiations;
   single photosensitive means located at said open end of said housing, said photosensitive means responsive to said light pulses emitted from said scintillators and producing electrical output signals therefrom; and
   pulse discrimination means responsive to said electrical output signals from said photosensitive means for identifying the light pulses from each of said three respective scintillators as determined by the respective and different decay constants of said light pulses.

7. The invention as defined in claim 6 wherein said pulse discrimination means includes:
   timing filter-amplifier means for processing said electrical output signals from said photosensitive means to form a sequence of shaped electrical pulses corresponding to the decay constants of the light pulses of said alpha, beta, and gamma scintillators, each of said shaped electrical pulses crossing a common baseline at unique crossover times determined by respective said decay constants of said light pulses;
   a pulse-shape discriminator for identifying said electrical output pulses as pulses from said alpha, beta or gamma scintillators based on respective said common baseline cross over times; and
   single channel analyzer means responsive to said pulse shape discriminator for simultaneously counting said electrical output pulses corresponding to said pulses from respective said alpha, beta, and gamma scintillators.

8. A unitary scintillation detector for sensing the presence of alpha, beta, and gamma radiations comprising:
   a housing having one side open and all other sides closed by a light-tight aluminum entrance window, said entrance window capable of passing alpha, beta and gamma radiations into said housing without substantial attenuation;
   three scintillators in series within said housing, said scintillators comprising a monolithic alpha/beta scintillator and a gamma scintillator, said monolithic alpha/beta scintillator comprising an alpha scintillator settled in a beta scintillator, said aluminum entrance window formed on the alpha scintillator end of said monolithic alpha/beta scintillator, said gamma scintillator located adjacent said open side of said housing, said alpha, beta and gamma scintillators successively responsive to said alpha, beta and gamma radiations passing through said entrance window, and each of said scintillators emitting light pulses having different decay constants for said alpha, beta and gamma radiations; and
   single photosensitive means located at said open side of said housing, said photosensitive means responsive to said light pulses emitted from said scintillators and producing electrical signals therefrom.

9. The invention as defined in claim 8 wherein said entrance window is covered by a non-alpha-attenuating layer of a hard coat material.

10. The invention as defined in claim 9 wherein said hard-coat layer is formed of cyanoacrylate.

11. A unitary scintillation detector for sensing the presence of alpha, beta, and gamma radiations comprising:
   a housing having more than one side open and all other sides closed by a light-tight aluminum entrance window, said entrance window capable of passing alpha, beta and gamma radiations into said housing without substantial attenuation;
   three scintillators in series within said housing, said scintillators comprising a monolithic alpha/beta scintillator and a gamma scintillator, said monolithic alpha/beta scintillator comprising an alpha scintillator settled in a beta scintillator, said aluminum entrance window formed on the alpha scintillator end of said monolithic alpha/beta scintillator, said gamma scintillator located adjacent said open sides of said housing, said alpha, beta and gamma scintillators successively responsive to said alpha, beta and gamma radiations passing through said entrance window, and each of said scintillators emitting light pulses having different decay constants for said alpha, beta and gamma radiations; and
   plural photosensitive means located at said open sides of said housing, said plural photosensitive means operative as a single photosensitive means, responsive to said light pulses emitted from said scintillators, and producing electrical signals therefrom.

12. The invention as defined in claim 11 wherein said entrance window is covered by a non-alpha-attenuating layer of a hard coat material.

13. The invention as defined in claim 12 wherein said hard-coat layer is formed of cyanoacrylate.

14. A unitary scintillation detector for sensing the presence of alpha, beta, and gamma radiations comprising:

a cylindrical housing having one end open and the remainder of the housing closed by a light-tight aluminum entrance window, said entrance window capable of passing alpha, beta and gamma radiations into said housing without substantial attenuation;

three scintillators in series within said housing, said scintillators comprising a monolithic alpha/beta scintillator and a gamma scintillator, said monolithic alpha/beta scintillator comprising an alpha scintillator settles in a beta scintillator, said aluminum entrance window formed on the alpha scintillator end of said monolithic alpha/beta scintillator, said gamma scintillator located adjacent said open end of said housing, said alpha, beta and gamma scintillators successively responsive to said alpha, beta and gamma radiations passing through said entrance window, and each of said scintillators emitting light pulses having different decay constants for said alpha, beta and gamma radiations; and single photosensitive means located at said open end of said housing, said photosensitive means responsive to said light pulses emitted from said scintillators and producing electrical signals therefrom.

15. The invention as defined in claim 14 wherein said entrance window is covered by a non-alpha-attenuating layer of a hard coat material.

16. The invention as defined in claim 15 wherein hard-coat said layer is formed of cyanoacrylate.

17. A unitary scintillation detector for sensing the presence of alpha, beta, and gamma radiations comprising:

a cylindrical housing having two ends open and the remainder of the housing closed by a light-tight aluminum entrance window, said entrance window capable of passing alpha, beta and gamma radiations into said housing without substantial attenuation;

three scintillators in series within said housing, said scintillators comprising a monolithic alpha/beta scintillator and a gamma scintillator, said monolithic alpha/beta scintillator comprising an alpha scintillator settled in a beta scintillator, said aluminum entrance window formed on the alpha scintillator end of said monolithic alpha/beta scintillator, said gamma scintillator located adjacent said open ends of said housing, said alpha, beta and gamma scintillators successively responsive to said alpha, beta and gamma radiations passing through said entrance window, and each of said scintillators emitting light pulses having different decay constants for said alpha, beta and gamma radiations; and photosensitive means located at each of said open ends of said housing, said photosensitive means operative as a single photosensitive means, responsive to said light pulses emitted from said scintillators, and producing electrical signals therefrom.

18. The invention as defined in claim 17 wherein said entrance window is covered by a non-alpha-attenuating layer of a hard coat material.

19. The invention as defined in claim 18 wherein said hard-coat layer is formed of cyanoacrylate.

20. A unitary scintillation detector for sensing the presence of alpha, beta, and gamma radiations comprising:

a housing having opposed ends, one of which is open and the second of which is closed by an aluminized plastic entrance window, said entrance window capable of passing alpha, beta and gamma radiations into said housing without substantial attenuation;

three scintillators in series within said housing, said scintillators comprising a monolithic alpha/beta scintillator and a gamma scintillator, said monolithic alpha/beta scintillator comprising an alpha scintillator settled in a beta scintillator, said aluminized plastic entrance window formed on the alpha scintillator end of said monolithic alpha/beta scintillator, said gamma scintillator located adjacent said open end of said housing, said alpha, beta and gamma scintillators successively responsive to said alpha, beta and gamma radiations passing through said entrance window, and each of said scintillators emitting light pulses having different decay constants for said alpha, beta and gamma radiations; and single photosensitive means located at said open end of said housing, said photosensitive means responsive to said light pulses emitted from said scintillators and producing electrical signals therefrom.

* * * * *